United States Patent [19]
Mita et al.

[11] Patent Number: 5,523,911
[45] Date of Patent: Jun. 4, 1996

[54] MINIMUM BEARING LOAD, HIGH PRECISION ACTUATOR ARM WITH FORCE COUPLE ACTUATION

[75] Inventors: Masahiro Mita; Juro Endo, both of Chula Vista; Ken G. Wasson, Foster City, all of Calif.

[73] Assignee: Hitachi Metals, Ltd., Tokyo, Japan

[21] Appl. No.: 143,531

[22] Filed: Oct. 25, 1993

Related U.S. Application Data

[63] Continuation of Ser. No. 823,710, Jan. 21, 1992, abandoned, which is a continuation-in-part of Ser. No. 750,091, Aug. 29, 1991, Pat. No. 5,295,031.

[51] Int. Cl.$^6$ ..................................................... G11B 5/55
[52] U.S. Cl. ............................................................. 360/106
[58] Field of Search ..................................... 360/104–107

[56] References Cited

U.S. PATENT DOCUMENTS

| 4,414,594 | 11/1983 | Farmer . | |
|---|---|---|---|
| 4,707,754 | 11/1987 | Patel et al. | 360/106 |
| 5,041,935 | 8/1991 | Aruga . | |
| 5,295,031 | 3/1994 | Wasson | 360/106 |

OTHER PUBLICATIONS

"Large Scale Magnetic Disk Files," Hitachi Review, vol. 35 (1986), No. 2, pp. 85–90.
"Design of a High Performance Rotary Positioner For a Magnetic Disk Memory," IEEE Transactions on Magnetics, vol. Mag–17, No. 4, (Jul. 1981), pp. 1392–1395.
"Mechanical and Servo Design of a 10 Inch Disk Drive," IEEE Transactions on Magnetics, vol. Mag–17, No. 4, (Jul. 1981).

*Primary Examiner*—John H. Wolff
*Attorney, Agent, or Firm*—Staas & Halsey

[57] ABSTRACT

A head positioning system for a magnetic disk drive includes an actuator arm that is mounted on a pivot bearing so that the axis of rotation of the arm passes through the center of mass of the arm. A Faraday-type motor using a single coil applies a force couple to the arm at a location offset from the center of mass of the arm with a constant moment arm. The offset force couple creates a pure torque about the axis of rotation of the arm (that is, about the pivot bearing) in order to substantially eliminate reaction forces on the bearing; this greatly lessens wear on the bearing and in turn reduces the non-repeatable run-out error of the read/write head mounted at the end of the arm. Various arrangements of permanent magnets and motor windings are provided to create the force couple. Furthermore, in certain embodiments, yokes are included to increase the magnetic field strength of the motor, thus increasing its power and reducing magnetic leakage and the risk of disturbing the data stored in the magnetic disk medium.

14 Claims, 6 Drawing Sheets

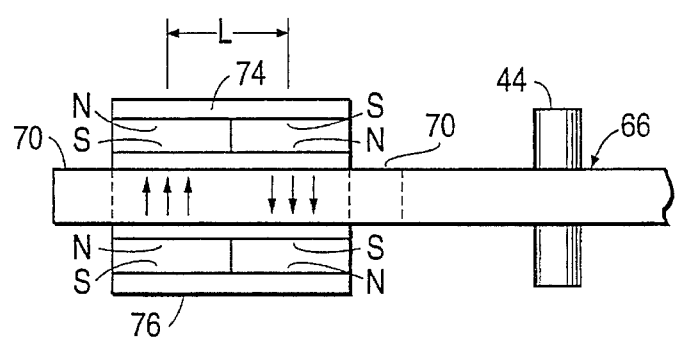
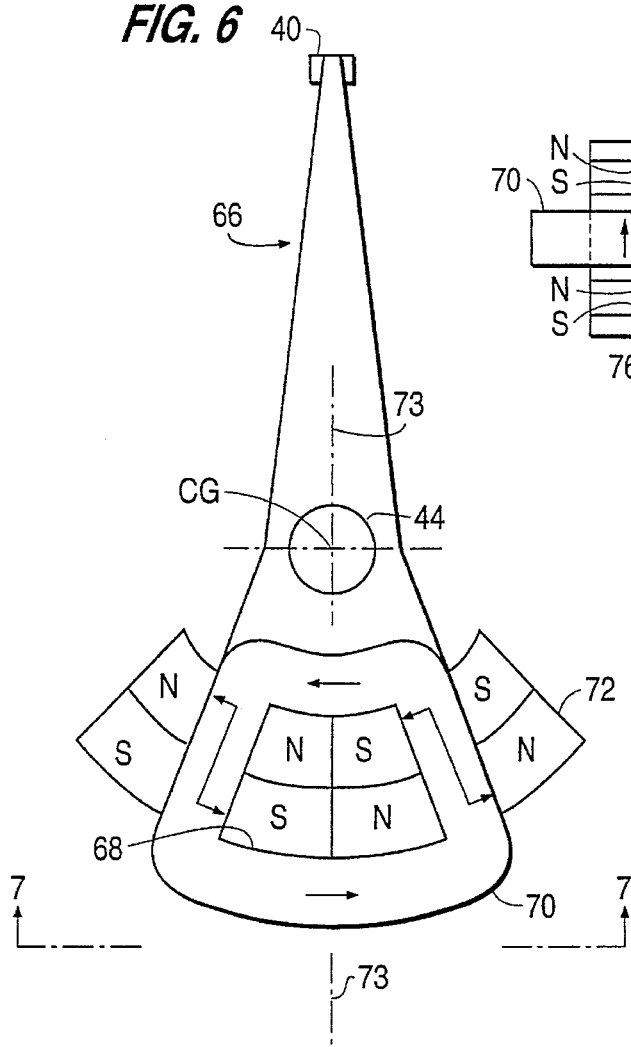
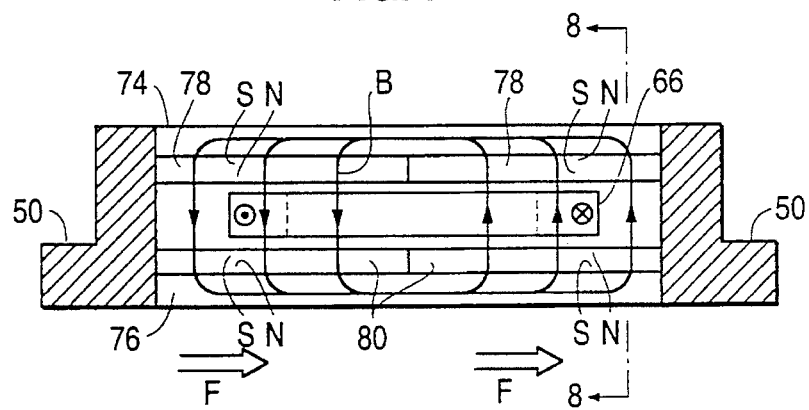

MINIMUM BEARING LOAD, HIGH PRECISION ACTUATOR ARM WITH FORCE COUPLE ACTUATION

CROSS-REFERENCE TO RELATED APPLICATIONS

This application is a continuation of prior application Ser. No. 07/823,710 filed Jan. 21, 1992 (now abandoned), which '710 application in turn is a continuation-in-part of prior application Ser. No. 07/750,091 filed Aug. 29, 1991 (now U.S. Pat. No. 5,295,031).

FIELD OF THE INVENTION

This invention relates to actuator arms in general and to head arms for magnetic disk drives in particular.

BACKGROUND OF THE INVENTION

In designing magnetic disk memory drives for computers, one wishes to maximize both the accessible information density of the disk and the life span of the drive. In most disk drives, access to the disk is via a read/write head that is located at the end of an actuator arm. The disk itself is usually divided into a series of concentric "tracks," and the disk rotates under the head. Each track, in turn, is divided into a series of adjacent data areas of minimum size, and each data area contains one "bit" of magnetically encoded information. U.S. Pat. No. 4,414,594 (Farmer, Nov. 8, 1983) illustrates a conventional disk drive system which uses a linear actuator to position read/write heads.

Obviously, the more "bits" one can pack into each track, and the more tracks one can fit on a disk, the more data can theoretically be stored on the disk. Information density, often measured in terms of "bits per inch" (BPI, measured linearly per track) and "tracks per inch" (TPI), therefore depends in part on how finely one can subdivide the surface of the disk into tracks and bit areas.

Even if one greatly increases the density of the disk, however, it may still be impossible to read the disk reliably because of the mechanical limitations of the drive. A major limiting factor in increasing the useful memory capacity of a disk drive is known as "non-repeatable run-out error," which is caused by an inability to locate the read/write head with sufficient precision and random radial movement of the disks caused by imperfections in the spindle motor bearings. Actuator arms in conventional disk drives require some bearing around which they rotate, moving the read/write head near the end of the arm toward and away from the center of the disk and holding the head immediately above the surface of the disk.

Non-repeatable error from the head actuation system arises because of random "wobbling" of the arm on its bearing, that is, the axis of rotation of the arm shifts slightly because of imperfections in the bearing. As the arm wobbles, the head will also move, but since the amount and direction of movement of the axis of rotation of the arm are random, it would be impossible to know for sure which bit area the head is over if the head moves randomly over more than one bit area. By way of example, assume that a particular disk has 1000 tracks per inch (TPI), that is, that each of the concentric tracks of the disk is approximately 0.001" wide (this is a typical value for track spacing on existing disks.) If the bearing radial movement is such that one cannot know the exact position of the head to better than ±0.0004" (two-fifths the track width), it would not be possible to use higher-density, 4000 TPI disks: since the track spacing on 4000 TPI disks is $\frac{1}{4000}$"=0.00025", and since this is less than the "play" of the head, one could never be certain that the head was now reading a particular track and not an adjacent one.

A common way to decrease bearing shift is to pre-load the bearings, which are often high-precision needle or ball bearings. For a while, this lessens shift since the actuator arm is joined more "tightly" to the pivot shaft. This solution, however, leads to quicker deterioration of the bearing itself due to the increased wear caused by greater pre-loading. As the bearing wears down, gaps once again arise and widen, and the problem of bearing shift returns, bringing with it the very problem of non-repeatable error pre-loading was meant to cure. Pre-loading therefore trades life span for precision.

Pre-loading is not the only force acting to wear down the pivot bearing of the actuator arm. In order to move the arm, some form of actuator motor is used to torque the arm about its pivot bearing. The greater the power of the motor, the faster the arm can accelerate and change tracks on the disk. Commonly used rotary actuators apply a magnetic force to the end of the arm opposite the head. The applied force, however, leads to a reaction force on the bearing. This reaction force, like the force of pre-loading, in turn causes wear on the bearing and leads sooner or later to greater bearing radial movement and to greater non-repeatable error. Using conventional technology, therefore, increased reading and writing speed for the head also comes at a cost of decreased long-term reliability and life span for the disk drive.

Mechanical resonance is another major problem that affects all disk drives. Historically, all hard disk drives have, to a greater or lesser degree, experienced performance problems related to resonant frequencies. Such resonant frequencies, if excited by drive operation or environmental conditions such as vibration, can significantly reduce the ability of the drive to keep the read-write head at the centermost part of the track width. This is known to those skilled in the art as "track following error". In worst cases the actuator may exhibit a radial displacement due to resonance which is a significant percentage of the track width and can lead to a read or write failure. As track width decreases to attain a greater number of tracks per inch, TPI, this problem becomes of greater importance.

Until recently, most resonance problems were related to resonant frequencies which were less than 3000 Hz (3 KHz). The stiffness of the assembly was generally increased to cause these resonances to then appear above 3 KHz; this was sufficiently high to allow acceptable performance for the TPI required at the time. This increased stiffness often included increasing the bearing preload.

Often the mass of the moving structures was decreased to increase the resonant frequency of that structure. As disk drives became smaller, the mass of the moving parts decreased accordingly and the resonant frequencies of the various modes of vibration moved even higher, in general, to above 5 KHz. This again was sufficiently high to allow acceptable performance for the new, higher TPI required for the new, smaller drives.

As hard disk drives become even smaller, the pivot bearing structure becomes a significant part of the moment of inertia of the rotating parts. However, it is not practical to use a smaller ball bearing because of the reaction forces this bearing must withstand.

Also, as hard disk drives have become smaller, another problem has arisen in the form of a low-frequency resonance. This problem is most apparent during track-following operations. With narrow track widths and the associated very small motions required to cause the head to remain near the center of the track, the pivot ball bearing structure does not immediately rotate in response to the force of the actuator, but reacts in a manner similar to a torsion spring, which has a variable spring rate. It is this spring-like behavior that gives rise to the low-frequency resonance that unfortunately occurs at or just above the disk rotational frequency. This resonance thus is easily excited by any disk imbalance or periodic spindle motor torque variation.

Any attempt to decrease the bearing preload to lower this resonant frequency below the disk rotational frequency results in a corresponding decrease in the higher resonant frequencies, thereby dropping them into dangerous frequency ranges incompatible with high TPI requirements. Furthermore, such reduction in bearing stiffness may cause head mis-position due to the reaction forces on the bearing, which are caused by the traditional actuator forces.

Again it is apparent that a reduction in reaction forces at the pivot bearing allows the designer to consider smaller or different bearing structures that can reduce the low-frequency resonant frequencies below the disk rotational frequency and yet allow the high- frequency resonances to stay high enough to accommodate the required high TPI.

Another theoretically possible way of reducing the load on the bearing would be to mount the arm directly onto the rotor shaft of a rotary motor. In so doing, pure torque would be applied to the arm and no significant reaction force would result on the shaft or its bearing. A rotary actuator motor, however, suffers from several drawbacks. First, since the moment arm for torquing the arm is short, the motor must be more powerful to achieve the same acceleration of the arm as compared to an actuator that acts on the end of the arm.

Second, rotary motors generate relatively strong magnetic fields, which often tend to disturb the reading and writing of the magnetically encoded data on the disk, or which require special shielding to prevent such disturbance. (Even non-rotary motors according to the prior art often suffer from this disadvantage.) Furthermore, the inductance of conventional rotary motors is so great that it takes a relatively long time for them to switch polarity and reverse head direction. In the case of a solution based on a rotary motor, therefore, longer bearing life comes at the cost of speed: one may perhaps be able to increase bit density, but it will take longer to read or write data to the disk.

Yet another disadvantage of many existing designs is that the actuator motors require so much vertical space that they are unsuitable for use in small or thin disk drives.

Still another shortcoming of many existing actuator motors is that the torque they apply to the arm varies depending on the angular position of the arm. This means that the acceleration of the arm is less when the head is over certain tracks of the disk than when it is over other tracks. Because of this, the time it takes for the arm to move between two tracks will vary depending not only on the relative distance between the tracks, but also on where on the disk the tracks happen to be. Access time for data over the surface of the disk is therefore not uniform.

In order to deal with the problem of non-uniform torque, some actuators use two or more coils whose accumulated forces are supposed to remain constant even though each coil's generated force varies. In other actuators, the cross-sectional shape of each coil is designed in such a way that, as the permanent magnets mounted on the arm move relative to the coils, the decrease in generated force is compensated for by an increased moment arm, so that, at least in theory, the product, and thus the torque, remains constant; in still other actuators, the same effect is achieved with one or more movable coils and fixed permanent magnets.

The problems with these solutions arise both at the manufacturing stage and during actual operation. First, increasing the number of coils usually increases mass and inductance, and makes such actuators ill-suited for use in compact disk drives where the magnetic memory medium is close to the actuator. Second, the relationship between the shape of the permanent magnets and the coils is limited by the necessity of keeping the force/moment arm product constant; this, in turn, increases design complexity and limits design flexibility.

Mounting permanent magnets on the arm itself not only increases the mass of the arm and slows its acceleration, but it also makes it more difficult to contain the magnetic field and prevent leakage to the disk or other magnetic memory medium and possible destruction of data. Furthermore, even though one may attempt to design the magnets and coils to maintain a constant torque regardless of their relative position, in practice, since the lines of magnetic flux are seldom perfectly straight, with easily calculated density, it is not possible to achieve truly constant torque.

OBJECTS OF THE INVENTION

The object of this invention is to provide an arrangement for mounting and driving an actuator arm such that reaction forces on the arm's pivot bearing are eliminated or at least greatly reduced, thus greatly lessening non-repeatable errors and increasing the permissible data density of disks. A further object is to provide a motor for driving the arm that is fast and compact, and that causes less magnetic disturbance than existing actuator motors. Yet another object of the invention is to provide an arm actuation system in which the torque applied to the arm is substantially uniform regardless of the angular position of the arm.

SUMMARY OF THE INVENTION

Because a force couple applied to a body acts as a pure torque about the center of mass of the body, no reaction forces arise if the body is mounted for rotation about its center of mass. In particular, the force couple applied by the actuator motor according to the invention creates a substantially pure torque on the arm about its pivot bearing; this means that there is little or no reaction force on the bearing, which in turn leads to less wear, smaller gaps, longer bearing life, and greater head precision than is possible using existing actuator arrangements.

Various arrangements of permanent magnets and motor windings are provided to create the force couple. For all of the arrangements, only a single coil is needed, and the windings and permanent magnets are arranged so that the torque that the motor applies to the arm is substantially uniform, regardless of the angular position of the arm, with a substantially constant moment arm. The portions of the windings that contribute to creating the force couple are mounted substantially perpendicular to the lines of magnetic flux of the permanent magnets, thereby maximizing the force these coil portions generate.

Furthermore, in certain embodiments yokes are included to increase the magnetic field strength of the motor, thus increasing its power and reducing magnetic leakage and the risk of disturbing the data in the magnetic disk medium.

BRIEF DESCRIPTION OF THE DRAWINGS

FIG. 6 is a view from above of an arm and motor configuration according to a second embodiment of the invention;

FIG. 7 is a view, taken generally along line 7—7 in FIG. 6, of the actuation end of an arm and an accompanying magnetic drive according to the second embodiment;

FIG. 8 is a partially sectioned side view of the arm and magnetic drive circuit, taken generally along line 8—8 in FIG. 7;

The scale of the drawings varies.

DETAILED DESCRIPTION

Figure 1:
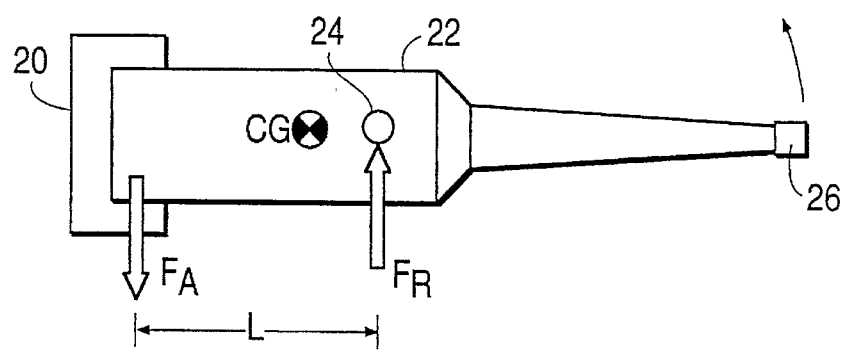
FIG. 1 illustrates a greatly simplified head positioning system according to the prior art.

The principle of operation of a conventional head positioning system for disk drives, as well as its main components, is illustrated in FIG. 1. A conventional motor 20 applies a magnetic force (indicated as a downward pointing force vector $F_A$) to the outer end of an arm 22. Unless otherwise stated, the term "arm" is used below to refer not only to the arm itself, but also to the other elements, such as head assembly, that are attached to and move with the arm, and that therefore add to the mass and moment of inertia of the body that the motor drives.

The arm is mounted on a pivot bearing 24, and has a center of gravity (mass) marked CG. A read/write head 26 is mounted on one end of the arm 22. The force $F_A$ acts on the arm 22 at a distance L (the moment arm) from the pivot 24 to create a torque $T=F\cdot L$ to turn the arm 22.

As is well known, since there is no translation of the arm, a force must exist that is equal in magnitude and opposite in direction to the applied magnetic force $F_A$. In conventional systems, this force is the reaction force $F_R$ which invariably arises and acts against the bearing 24. As is discussed above, it is this reaction force that leads to the need for bearing pre-loading and to decreased life span of conventional systems. Since there is a non-zero resulting force $F_A$ applied to the arm 22, the reaction force $F_R$ will arise even if the pivot bearing were to be located through the center of mass of the arm.

Figure 2:
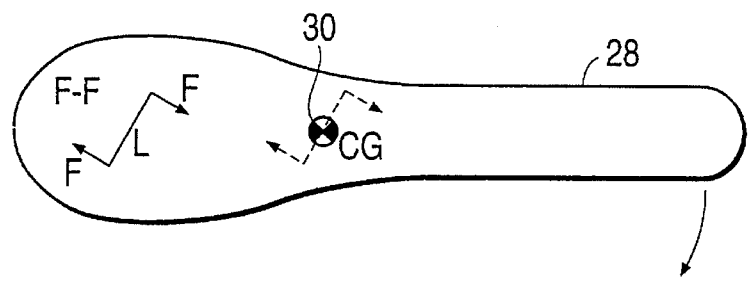
FIG. 2 illustrates the principle of torque translation applied in the invention.

FIG. 2 illustrates the principle that the invention utilizes to eliminate the problem of bearing reaction force. In FIG. 2, a force couple F—F (forces of equal magnitude acting parallel but opposite to each other), is applied to a arbitrary rigid body 28, which has a center of gravity CG. The lines of action of the forces F are at a distance L apart (creating a moment arm of ½L for each), so that the torque $T=F\cdot L$.

As is well known from classical mechanics, regardless of where on the body the couple F—F is applied, the torque generated by the couple is pure (no resulting force, since the forces are opposite and of equal magnitude) and is translated so that it acts about the center of gravity CG of the body 28. If the body 28 is mounted on a pivot bearing that is located at the center of gravity CG, the body will rotate as a result of the pure torque, with no reaction force on the bearing. According to this invention, the rigid body is the arm of a head positioning system, the actuating motor applies a force couple to the arm, and the arm is mounted on a pivot bearing at its center of gravity.

Figure 3:
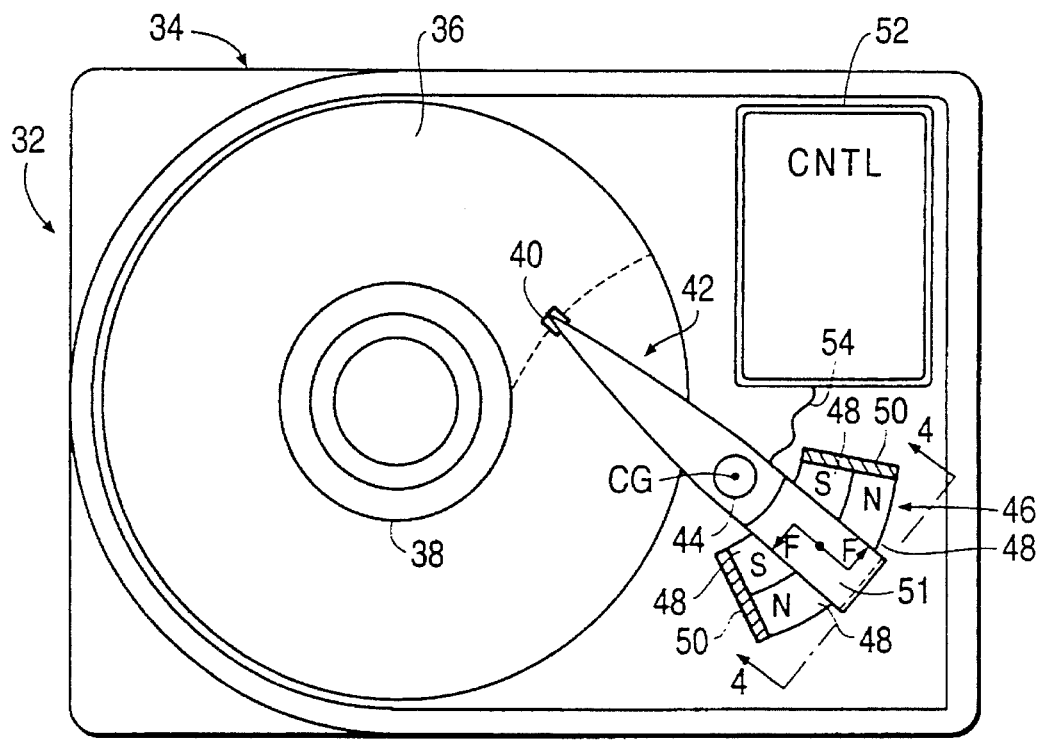
FIG. 3 is a view from above of a simplified illustrative embodiment of a disk drive incorporating a partially disassembled first embodiment of the invention.

FIG. 3 illustrates the main components of a disk drive (indicated generally by the number 32) and the head positioning system according to the invention. The disk drive 32 has a housing 34, which protects and forms a base for the other components. A motor drive (not shown) spins a memory disk 36, which is free to rotate on a spindle 38.

According to the invention, a head 40 is mounted on one end of an arm 42, which is mounted on a pivot bearing 44. The arm moves substantially in the plane of the paper, although some small flexing is allowable in certain applications, especially those in which a light-weight, thin arm is used to reduce its inertia and increase its ability to accelerate. The pivot bearing can be a conventional bearing, such as a ball or needle bearing. The axis of rotation of the pivot bearing 44, and thus of the arm itself, passes through (as close as possible) the center of mass of the arm, which is easily determined at the time of manufacturing using known methods.

In the remaining discussion of the invention, "vertical" will refer to the direction perpendicular to the plane of motion of the arm; "radial" will refer to the direction of a vector beginning in the pivot 44; "tangential" will refer to the direction perpendicular to the radial direction and in the plane of motion of the arm; "longitudinal" will refer to the direction along the centerline of the arm, that is, the line through the pivot roughly bisecting the arm; "inner" and "outer" will refer, respectively, to features closer to and farther away from the pivot in the radial direction; and "above" and "below" are referenced to the vertical direction defined above.

A motor, indicated generally by the number 46, includes a plurality of permanent magnets 48, which are rigidly mounted in a support 50. The support is preferably non-magnetic, but even a magnetic support may be used if the loss of efficiency caused thereby can be tolerated. Each magnet is shaped generally as an arc section of a circle (preferably with its center at the pivot point of the arm), concentric with the others. In FIG. 3, the parts of the motor above the arm 42 are omitted or sectioned in order to make the general configuration more clearly understandable. At the end of the arm 42 on the other side of the pivot from the head 40, the arm 42 is provided with windings 51, which form a rigid coil securely attached to the arm.

The coil 51 can be attached without support to the end of the arm at the motor; it can be mounted on a support that is attached to the end of the arm; or it can be wound around an opening in the arm itself. However attached, the center of gravity CG of the arm is to be calculated with respect to all parts that contribute to the movable mass of the arm 42. The axis of the coil 51 is substantially parallel to the plane of motion of the arm and perpendicular to the longitudinal axis of the arm. The motor is thus preferably of the Faraday type, in which the coil moves according to the relationship F=B·l·i, where F is the force, B is the magnetic field strength, l is the coil wire length that is inside of and orthogonal to the magnetic field B, and i is the current within such length of wire l.

Control circuitry 52 (not described further) supplies electrical current to the arm windings 51 via conventional conductors 54. By changing the strength and polarity of the current it supplies to the windings 51, the control circuitry 52 can change the speed and direction with which the arm moves. In FIG. 3, if the arm 42 is forced to rotate clockwise, the head 40 will move outward, away from the center of the disk 36. The dashed line passing through the head 40 in FIG. 3 indicates approximately the line of travel that the head 40 may follow over the surface of the disk. A force couple F—F is indicated on the windings 51; the manner in which this force couple is created is explained below.

Figure 4:
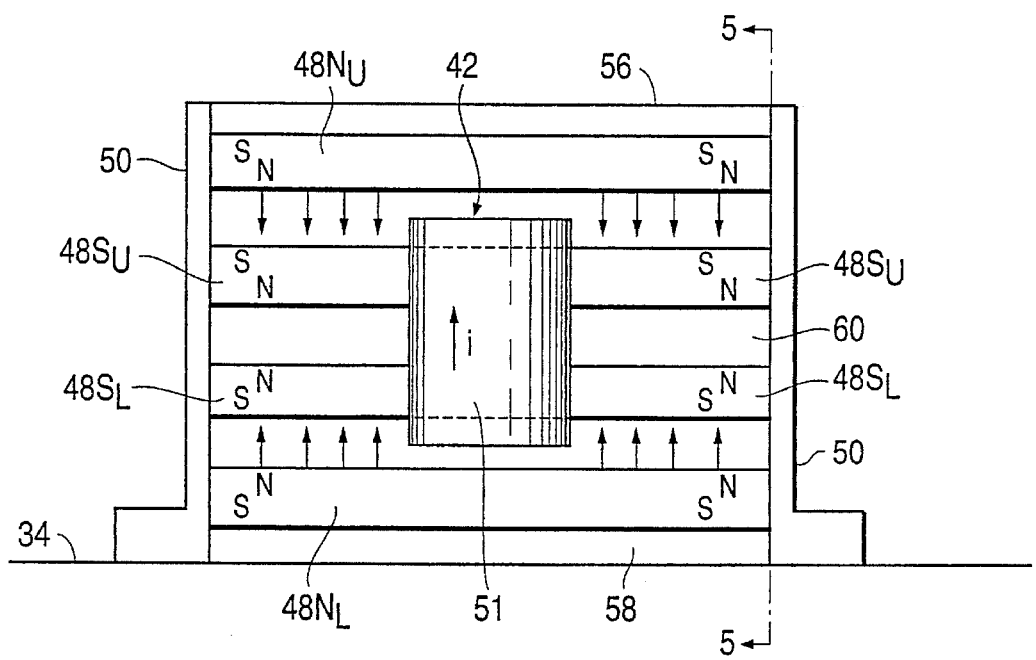
FIG. 4 is a view, taken generally along line 4—4 in FIG. 3, of the actuation end of an arm and an accompanying magnetic drive according to the first embodiment.

FIG. 4 is an enlarged end view of the first embodiment of the invention. For the sake of clarity only, certain features that lie behind the illustrated features and would normally be partially visible (such as the pivot) are not shown. In the first embodiment, the motor includes four north-south (N-S) pole pairs, formed by permanent magnets; two magnet pairs are visible in FIG. 4. FIG. 4 can be viewed as being divided into two sections, an upper section and a lower section, with a different pole pair in each section. The various magnets are indicated by the designation 48Xy, where X is the polarity (N or S) at the air gap between the magnet pair and y is the section (u:upper, l:lower). The visible uppermost permanent magnet in the upper section is therefore $48N_U$, and so on.

As FIG. 4 illustrates, the first embodiment preferably includes an upper yoke 56, a lower yoke 58 and a central yoke 60. All the yokes are mainly plate-like and are preferably of soft iron. The yokes are held rigidly by the non-magnetic support 50. The yokes serve not only to hold the permanent magnets in place, but also to increase operating point and therefore the field strength of the magnets. Also, the yokes concentrate the flux lines of the magnets near the working gaps, thereby increasing the efficiency of the various magnetic circuits of the motor and reducing the amount of magnetic leakage that otherwise could disturb the magnetic medium of the disk.

In FIG. 4, the lines of magnetic flux between the four shown pole pairs are indicated by series of small, substantially parallel arrows pointing from the north pole to the south pole of each pole pair. Furthermore, the direction of current in the windings 51 is indicated by the arrow marked "i". Since the control circuitry reverses the direction of movement of the arm by reversing the polarity of the current i, the upward-pointing arrow for i is by way of example only. (In fact, since the current moves in a loop, its direction will be "down" on the other side of the winding; this is illustrated below).

As FIG. 4 indicates, the center yoke 60 and the magnets $48S_U$ and $48S_L$ it supports extend through the coils. Furthermore, the outer end of the arm 42 moves between the magnets ($48N_U$ and $48N_L$) supported by the upper and lower yokes 56, 58. The gap between pole pairs of magnets, for example, between $48N_U$ and $48S_U$, should be as small as possible to maximize the magnetic field strength, yet must not be so narrow as to impede the free travel of the arm and its windings 51.

Although the various permanent magnets shown in FIG. 4 are shown as being unitary, this is not necessary. Instead, any or all of the permanent magnets could be replaced by a set of two or more adjacent permanent magnets with the same polar orientation.

At this point it is useful to recall Fleming's Law or Left-Hand Rule, which relates the force generated when electrical current moves in a magnetic field. According to Fleming's Left-Hand Rule:

$$F = I \times B$$

in which:

I is the vector of the electric current;

B is the vector of magnetic flux;

F is the resulting vector force on the current-carrying wire; and

"×", is the vector cross product.

In the special case in which the flux and current are parallel, the resulting force therefore has zero magnitude. In the special case in which the flux and current are perpendicular to each other, the force F has a magnitude equal to the scalar product of the magnitudes B and I.

As is well known, one obtains the greatest force when B and I are perpendicular to each other. Consequently, in order to make the motor as compact as possible while still generating as much force as possible (thereby increasing arm acceleration), the coil windings that contribute to the driving force of the motor should be perpendicular to the magnetic flux lines. This is done in all illustrated embodiments of the invention.

Figure 5:
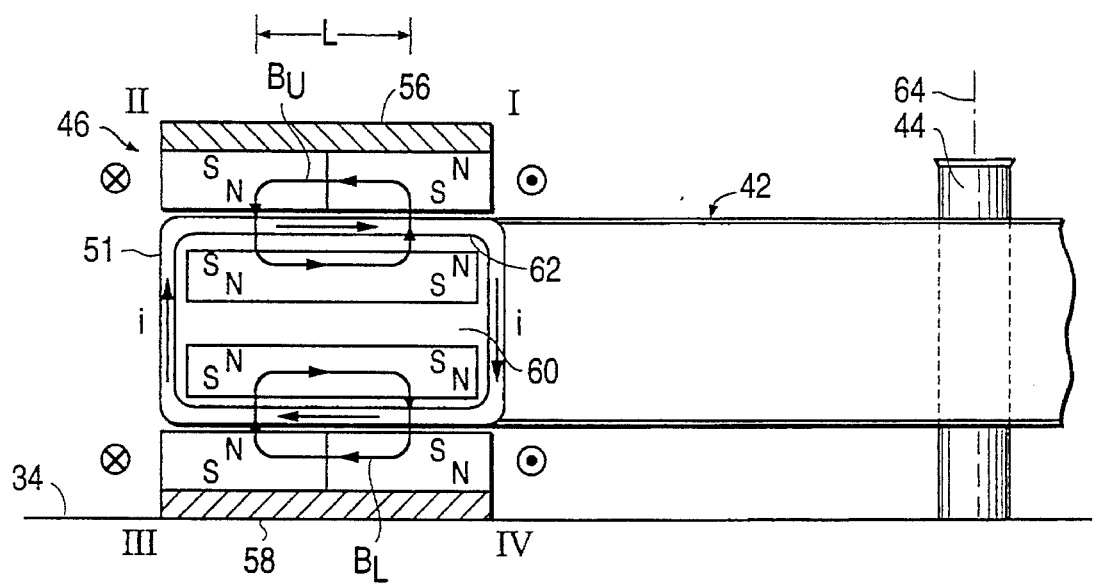
FIG. 5 is a partially sectioned side view of the arm and magnetic drive circuit, taken generally along line 5—5 in FIG. 4.

FIG. 5 is a side view of the motor 46, the arm 42, and the pivot 44 (sectioned, and illustrated in simplified form) in the first embodiment of the invention. The arm 42 itself and the various visible magnets have not been sectioned in order to ease visualization and understanding of the generated magnetic forces. FIG. 5 is divided into four quadrants I–IV for ease of explanation only.

In FIG. 5, the magnetic circuits created amongst the various pole pairs above and below the center yoke 60 are indicated as the directional loops $B_U$ and $B_L$, respectively. Viewed as in FIG. 5, the upper magnetic circuit $B_U$ flows counter-clockwise; the lower magnetic circuit $B_L$ flows clockwise.

FIG. 5 also shows the electric current i in the windings 52 as running clockwise. This is by way of example only, and by applying Fleming's Left-Hand Rule one can determine the proper magnetic polarity and direction of current flow i to achieve the desired force direction on the coil.

Consider now the pole pair of magnets located in quadrant I, that is, the south pole of the magnet attached beneath the upper yoke 56 and the north pole of the magnet attached above the center yoke 60. The magnetic flux lines between this pole pair flow substantially upward, viewed as in FIG. 5. The current i, however, flows toward the right between these magnets. Applying Fleming's Law, therefore, the force vector created as the current i flows to the right between this pole pair will point out of the plane of the figure. In FIG. 5 and later figures, a vector pointing into the plane of the drawing sheet is indicated with a circle-cross ⊗ and a vector pointing out of the plane of the drawing sheet is indicated with a circle-dot ⊙.

For the pole pair in quadrant II, the direction of the current i is the same as for the pole pair in quadrant I. The direction of the magnetic flux, however, is substantially downward. Once again applying Fleming's Left-Hand Rule, the force on the coil generated in quadrant II is therefore directed into the plane of the drawing sheet.

Since a) the magnetic flux is substantially of equal strength between the pole pairs in quadrants I and II; b) the length of the windings 51 between each pole pair is substantially equal; and c) the strength of the current between each pole pair is substantially constant, then the magnitude of the inward-directed force in quadrant II is substantially equal to the magnitude of the outward-directed force in quadrant I. In other words, the configuration of the two pole pairs above the center yoke 60 creates equal but oppositely directed, parallel forces that act on the movable arm 42—they create a force couple offset from the axis of rotation (indicated by the dash-dotted line 64) of the arm 42 with a constant moment or torque arm length L.

Indeed, the magnets above the center yoke 60 alone create a force couple sufficient to actuate the arm 42. In order to increase power, efficiency, arm acceleration, and balance, however, the first embodiment illustrated in FIGS. 3–5 preferably includes the lower magnets and the lower yoke 58 as well.

In order to determine the forces generated by the lower magnets, one need only consider that the region below the central yoke 60 is substantially a "mirror image" of the region above: the direction of magnetic flux will be reversed (pointing upward for the lower left pole pair and downward for the right pole pair in FIG. 5), but so will the direction of the current i, since, in flowing clockwise in the loop of the coil windings 51, it flows to the right below the center yoke 60 if it flows to the left above it.

The two "reversals" therefore "cancel" each other out, so that the resulting forces to the left and right below the center yoke 60 are directed in the same direction as the forces to the left and right, respectively, above the center yoke 60. In other words, the lower magnetic circuits (below the center yoke 60) duplicate and double the forces one would achieve using only the upper circuits. In addition to doubling the force of the motor, a further advantage of arranging substantially identical magnetic circuits (but with opposite polarities) above and below the center yoke is that any vertical forces (upward and downward viewed as in FIG. 5) that one circuit might generate will be canceled out by the oppositely directed forces generated by the lower circuit. This in turn eliminates any vertical bending force on the arm, which otherwise would be transmitted to the bearing 44.

At the outer and inner edges of the coil (the rigid windings 51), that is, the portions of the windings to the left and right, respectively, in FIG. 5, the direction of current flow is vertical (viewed as in FIG. 5). Since the flux lines of the magnets are also substantially vertical, according to Fleming's Law, the resulting force is zero. The forces generated at the "corners" of the coil 51 will be of negligible magnitude, but will nonetheless have the same direction as the main force vectors in their respective quadrants. In the first embodiment, the vertical portions of the coil, that is, those windings extending mainly parallel to the axis of rotation of the arm, act as the "non-driving" portions, since as the current flows through them it does not contribute to generating force on the arm, whereas the portions of the windings that extend in the plane of motion of the arm are substantially perpendicular to the flux lines and act as "driving" portions" that contribute to driving the arm.

Referring to FIG. 4 once again, note that the upper magnet 48$N_U$, the lower magnet 48$N_L$, the upper central magnet 48$S_U$, and the lower central magnet 48$S_L$, may be divided into two or more magnets, as long as their polarities are kept opposite the polarities of their opposing magnets in their respective pole pairs. Also, referring to FIG. 5, observe that all of the magnets could be rotated 180 degrees; if the current direction is also reversed, the generated forces would be the same. Although it is possible to construct the first embodiment using only four plate-like magnets, more, smaller magnets will occasionally be preferred because of their greater availability.

Since the vertical "edge" portions of the coil 51 can be made very small relative to the "horizontal" portions that are located between magnetic pole pairs, the proportion of effective coil length of the first embodiment is high. Furthermore, the mass of the rigid coil in the first embodiment can be kept relatively small, and this in turn decreases the inertia of the arm and allows for greater arm acceleration. The efficiency of the first embodiment also allows for a relatively small coil, which lessens the inductance of the coil and allows faster switches in the direction of the coil current and thereby even greater arm acceleration. On the other hand, the first embodiment is three layers (yokes) high.

FIGS. 6–8 illustrate a second embodiment of the invention that is only two layers high, and can thus be manufactured to be more compact, or at least thinner, than the first embodiment. Furthermore, since the general shape of the arm and yoke in the second embodiment is somewhat similar to the general shape of many existing arms and motors, the second embodiment of the invention can be readily used in conventional disk drive configurations.

The arm 66 once again is mounted on a pivot bearing 44 so as to pivot about the center of gravity of the arm 66. In the second embodiment, the outer end of the arm 66 widens, but has an opening 68 around which the arm 66 carries a rigid coil 70. The axis of the coil 70 is substantially perpendicular to the plane of motion of the arm 66. By way of example only, the current i in the coil 70 is flowing counterclockwise, viewed from above as in FIG. 6.

The motor in the second embodiment includes two parallel arrays of permanent magnets 72 (only the bottom of which is shown in FIG. 6). Each magnet is shaped generally as an arc section of a circle (preferably with its center at the pivot point of the arm), concentric with the others. The polarities of magnets on one side of a separation plane, which extends perpendicular to the plane of the figure along the longitudinal centerline 73 of the arm, are the opposite of the polarities of the magnets located in the "mirrored" positions on the other side of the separation plane.

The width of the central opening in the coil 70 is such that the leftmost (viewed as in FIG. 6), mainly radially extending, portion of the coil windings is always over the left set of permanent magnets, and such that the rightmost, mainly radially extending, portion of the coil windings is always over the right set of permanent magnets over the entire range of motion of the arm; otherwise, were both "driving" windings to come over the same set of magnets, the two torques generated would be oppositely directed and would cancel each other out.

FIG. 7 is an end view of the second embodiment. The second embodiment includes an upper yoke 74 and a lower yoke 76, both of which are rigidly supported by the non-magnetic support 50 (which may be differently shaped than the support in the first embodiment, but the reference number has been retained for the sake of simplicity). The second embodiment includes four magnetic pole pairs divided into left-right and inner-outer. Upper permanent magnets 78 are attached to the underside of the upper yoke 74, and lower magnets 80 are attached above the lower yoke 76. The arm 66 is free to move laterally between the upper and lower magnets; the gap between the arm and the magnets is preferably as small as possible while not impeding the free movement of the arm.

In FIG. 7, the lines of magnetic flux B created by the outermost (end) magnets form a magnetic circuit that runs counterclockwise. Between the left end magnets, the direction of current is out of the plane of the drawing sheet (FIG. 7) whereas, between the right end magnets, the direction of current is into the plane of the drawing sheet. Applying Fleming's Law, these outer magnets, in cooperation with the counterclockwise flowing current, create a force on the coil directed to the right (see the double arrow right F).

Consider now the inner set of magnets (those closest to the bearing 44) as seen in FIGS. 6 and 8. The polarities of these magnets are reversed relative to the outer set, so the magnetic circuit they form will run opposite the direction of the outer set of magnets. The current i, however, flows in the same direction for the inner set as for the outer; since only one of the vectors (B) in the right-hand side of Fleming's equation changes sign, the force vector changes sign (that is, the direction of force is reversed). Since the width of the inner magnets (their effective length) is the same as for the outer magnets, the magnitude of the force they generate will be the same.

In other words, in the second embodiment, a force couple is formed by each of the right and left sets of magnetic pole pairs, acting through torque arm L, with the resulting torque on each side acting in the same direction. Both of these torques are transferred to act on the arm at its CG.

Figure 11:
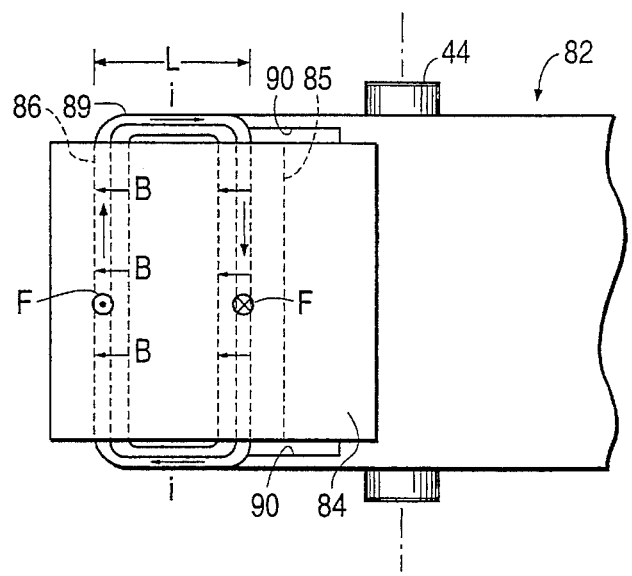
FIGS. 9–11 are a top view, and end view, and a side view, respectively, of a third embodiment of the invention.
Figure 9:
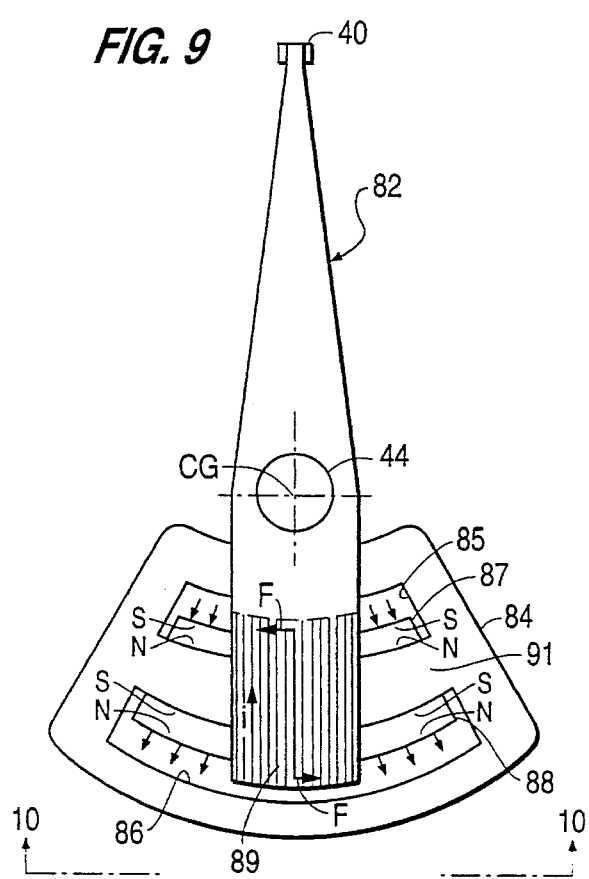
Figure 10:
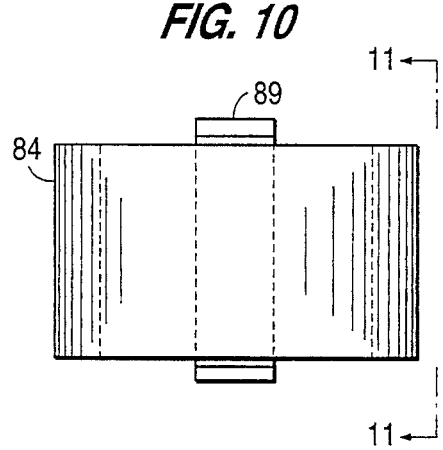

FIGS. 9–11 illustrate a third embodiment of the invention, in which, as before, an arm 82 is supported at its center of gravity by a pivot bearing 44. Also as before, the motor includes a yoke 84 that supports a plurality of permanent magnets. In the third embodiment, the yoke 84 has two arc-shaped openings, a first or inner opening 85 and a second or outer opening 86, on either side of a central arc-shaped yoke portion 91. A first permanent magnet 87 is securely attached to the inner wall (nearest the bearing 44) of the first opening 85 and a second permanent magnet 88 is securely attached to the inner wall (nearest the bearing 44) of the second opening 86.

Alternatively, the first permanent magnet can be attached to the outer wall (farthest from the bearing 44) of the first opening 85 and the second permanent magnet 88 can be attached to the outer wall (farthest from the bearing 44) of the second opening 86. This alternative arrangement may in some applications be preferably since it allows the arm to be somewhat shorter.

Each of the permanent magnets 87 and 88 may also consist of two or more adjacent magnets with the same alignment of poles. This will decrease the hysteresis that accompanies a single, long magnet, and permit the use of modern magnetic materials (including non-ferrous).

The arm 82 supports the windings of a coil 89 such that the central axis of the coil extends in the tangential direction. The arm 82 preferably has an opening 90 so that the arc portion 91 of the yoke passes through the opening 90 as the arm moves; in other words, the coil 89 encircles the arc portion 91 and the outer permanent magnet 88. The arc portion 91 thereby defines a cylindrical separation surface (extending perpendicular to the plane of motion of the arm) in which the inner and outer magnets are "mirrored" with respect to their polarities and locations.

Lines of flux are drawn in FIG. 9 as small arrows, which point from the N-pole of the inner permanent magnet 87 to the S-pole of the outer permanent magnet 88. The windings of the coil 89 that extend vertically (parallel to the axis of rotation of the arm) are those which participate in driving the arm. As in the first and second embodiments above, the distance or gap between the permanent magnets 87, 88 should preferably be made as small as possible (without hindering the free movement of the arm) in order to increase the force of the motor.

Consider now FIG. 11, which is a side view of the coil 89, that is, a view taken along the central axis of the coil. By way of example, the current i is shown running clockwise in the coil 89. The flux lines B flow substantially outward in the radial direction. With regard to the upper and lower portions of the windings, which extend in the arm's radial direction, the current in these portions flows in a direction mainly parallel to the flux lines; according to Fleming's Law, the force created by these coil portions is zero.

Viewed as in FIG. 11, the current in the inner vertical portion of the coil flows downward, however, and the current in the outer vertical portion flows upward. Applying Fleming's Law once again, the magnetic force F exerted on the arm at the outer coil portion points out of the plane of the paper, and the magnetic force F exerted on the arm at the inner coil portion points into the plane of the paper.

By making the permanent magnets 87 and 88 of equal height, and making the coil 89 of constant width, the effective length of the permanent magnets is the same, so that the magnetic forces they generate have the same magnitude. The forces are of opposite direction, however, so that a force couple F—F is created in the arm, with the constant torque arm L approximately equal to the distance between the vertical portions of the coil 89. As before, therefore, the motor creates a pure torque to turn the arm, with no appreciable reaction force arising at the bearing 44.

Since the vertical portions of the coil 89 are those that participate in generating the force couple, the proportion of effective coil length can be increased by increasing the height of the yoke 84. Thanks to the large yoke 84 in this embodiment, moreover, there is almost no leakage of the magnetic field created by the permanent magnets and the coil. Furthermore, since the general shape of the arm and yoke in the third embodiment is somewhat similar to the general shape of many existing arms and motors, the third embodiment of the invention can be more readily used in conventional disk drive configurations than can the first embodiment.

Figure 12:
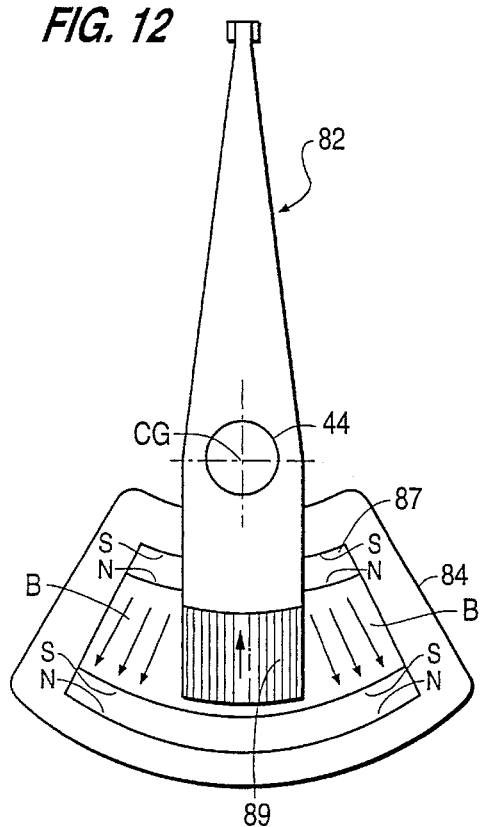
FIGS. 12 and 13 illustrate alternative configurations of the third embodiment.

FIG. 12 illustrates a variation of the third embodiment, which has no center yoke portion, but rather in which the yoke 84 has only a single central opening. In this variation, the flux lines B flow from the inner permanent magnet(s) 87 to the outer permanent magnet(s) 88, which are securely mounted on the mainly cylindrical interior walls of the opening of the yoke.

The arm coil 89 does not encircle any portion of the yoke, although the arm itself will have an opening (so that, from the side, the arm "splits" to extend above and below the yoke) that fits over the inner curved portion of the yoke and the inner permanent magnet(s) 87. In this embodiment, however, it is also possible to include a central yoke to increase the magnetic flux density (with the outer permanent magnets 88 still not attached to the central yoke).

Figure 13:
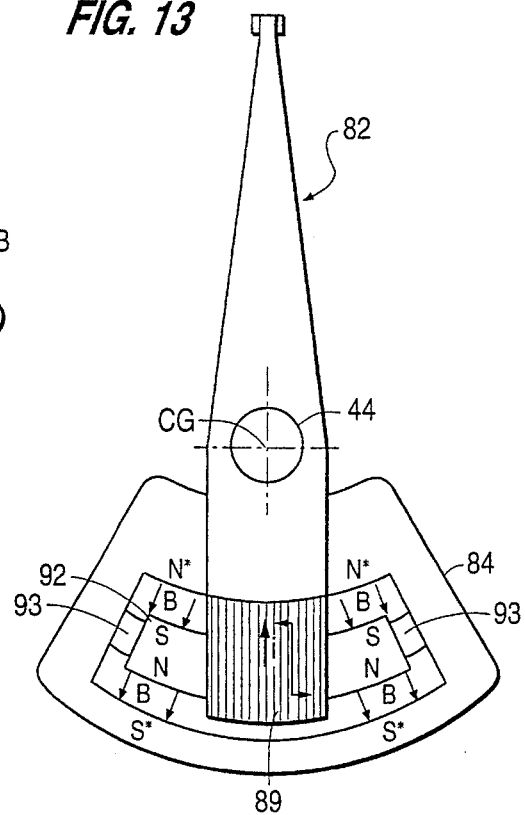

FIG. 13 illustrates yet another variation of the third embodiment, which has no center yoke portion, but rather in which a single arc-shaped permanent magnet 92 is mounted within the single yoke opening and is attached to the side walls of the yoke via supports 93. The supports 93 are preferably non-magnetic, but even magnetic supports may be used if the loss of efficiency caused thereby can be tolerated. In this variation, the arm has an opening, similar to the single opening 90 shown in FIG. 11, through which the permanent magnet extends as the arm moves. The coil 89 also encircles the permanent magnet 92.

The embodiments of the invention shown in FIGS. 4–12 all include at least two sets of permanent magnets, whose polarities are reversed relative to the opposing magnets in each pair. This opposition forms the magnetic circuits and gives rise to the flux lines B that interact with the current i to create the force couple on the arm. In FIG. 13, however, there is only the single magnet 92 (or adjacent set of aligned magnets). In this variation, the yoke 84 itself acts as the opposing magnet to complete a magnetic circuit, and the induced polarities of the inner and outer arc-shaped portions of the yoke that participate in the circuit are indicated by N* and S*. Another advantage of the embodiment illustrated in FIG. 13 is that low-coercivity magnetic materials such as AlNiCo may be used.

The yokes 84 in the variations shown in FIGS. 12 and 13 have no central yoke portions and are therefore lighter and easier to manufacture. For ease of visualization, the gaps between the permanent magnets and the coil windings are shown in FIGS. 12 and 13 much larger than they would actually be. Instead, the gaps between the magnets (permanent or induced) should be made as small as possible to increase the magnetic force. This will in turn also make these variations very compact in the radial direction. The drawback of these variations, however, is that they will in general be weaker than the first through third embodiments described above. On the other hand, these embodiments have the advantage that they can be made very thin (vertically compact) but wide. As such, these embodiments can have relatively large pole separation; this in turn creates a greater moment arm that will provide high torque even for relatively weak magnets.

Figure 14:
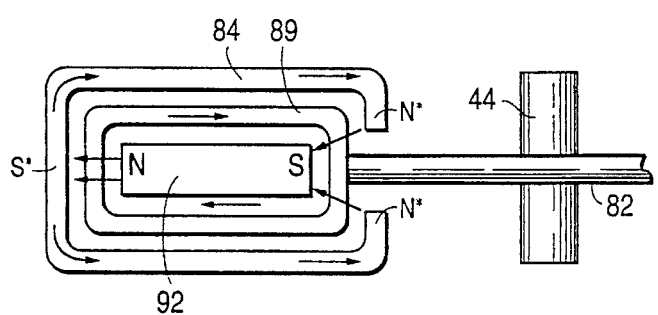
FIG. 14 illustrates an alternative yoke configuration for the actuator according to the invention.

FIG. 14 is a schematic side view of a C-shaped yoke configuration that can be used in any embodiment of the invention instead of one or more separate, mainly planar yokes. (By way of example only, a single-permanent- magnet configuration similar to that shown in FIG. 13 is illustrated.) In this alternative yoke configuration, the unitary yoke 84 extends beneath, behind (outside of) and above the coil 89, which in turn encircles the permanent magnet 92.

The yoke is therefore shaped like a casing open at each side and with a slot in its inner wall through which the arm 82 passes. Given the orientation of the permanent magnet shown in FIG. 14 (with N outward and S inward), opposing poles S* and N* are induced in the yoke as shown. The lines of magnetic flux above a horizontal plane dividing the permanent magnet will run clockwise, and the flux lines below this dividing plane will run counter-clockwise. Because the yoke 84 substantially surrounds the permanent magnet 92 and coil 89, leakage of the magnetic field outside of the motor is greatly reduced. Even in very compact drives, this C-shaped yoke configuration substantially eliminates the risk of magnetic disturbance and contamination of the memory medium.

The other embodiments of the invention of course also have several possible variations for the yoke/magnet configurations. FIGS. 15 (a)–(d) illustrate some of the many possible variations for the first embodiment. Compare these variations with the side view shown in FIG. 5. In each variation, three yokes 56, 58, 60 are used, whereby the coil 51 (illustrated as a single winding in FIGS. 15 (a)–(d)) encircles the center yoke 60. A single flux line B is indicated for each magnetic circuit; magnets are labelled N or S, and poles induced in the yokes are labelled N* or S* as the case may be to complete the magnetic circuit. As in the descriptions above, the direction of current i is shown by way of example only; the control circuitry will reverse its polarity in order to reverse the direction of movement of the arm.

In all of the illustrated variations in FIGS. 15 (a)–(d), observe that configurations are "reflected" or "mirrored" about a plane (which, in these cases, is parallel to the plane of motion of the arm) that bisects the center yoke 60. Consider now the upper magnetic circuit, formed by the upper and center yokes 56, 60 and the magnets attached to or induced in them. The direction of flux for each magnetic circuit at one side of the circuit is 180 degrees opposite the direction at the opposing side of the flux loop. Since the direction of the current i does not change as it crosses these two sets of flux lines, the forces generated in each region are oppositely directed but of equal magnitude, and thus form a force couple acting on the arm, through torque arm L.

As FIGS. 15 (a)–(d), illustrate, a common inventive principle can be used to develop the various embodiments of the invention, as well as the many other possible embodiments. Windings conduct current through two regions of magnetic flux (either of two magnet magnetic circuits or of two different regions of a single magnetic circuit). In both regions, either the flux lines or the direction of current is substantially parallel to the longitudinal axis of the actuator arm and to each other, with the direction of current flow, relative to the flux, in the one region being opposite to the direction of current flow, relative to the flux, in the other region.

This principle is the same in all embodiments of the invention: either the flux changes direction relative to a constant current direction for each of one or more magnetic circuits, or the direction of current changes relative to a constant flux direction. In all embodiments, therefore, a force couple with a constant moment arm is generated that applies a pure, constant torque to the arm. Since the arm is mounted for rotation about its center of gravity, no significant reaction force arises in the bearing.

In all the embodiments of the invention, the active portions of the actuator coil, that is, the portions that are not parallel to the lines of magnetic flux and that therefore generate force as current runs through them, are substantially straight and perpendicular to the magnetic flux lines over the entire range of motion of the arm. Theoretically, uniform torque is thus generated without a need for compensating coils or matched sets of coils, or for any need to design the magnets and coil so that a decrease in torque is offset by an increase in moment arm.

In practice, the magnetic field in a typical working gap decreases at the ends of the permanent magnet due to flux leakage from one pole face of a magnet to the opposite pole face. The change in gap flux density is manifested in a corresponding change in torque constant with rotational position. This invention provides a means of compensating for such variations in torque constant. Examples of such compensation include:

1. Torque arm variation at the ends of rotational travel in certain embodiments;

2. Magnet shape modification to present more pole surface area to the coil windings at the ends of rotational travel; and 3. Increase of magnet length (N to S) to provide a higher magnet load line, thus creating greater field strength in the working gap at the ends of rotational travel.

Furthermore, only a single coil is needed to generate the balanced, uniform torque. Also, the torque or moment arm of the force couple generated in each embodiment remains constant regardless of the position of the arm as it moves back and forth in the motor.

Figure 16:
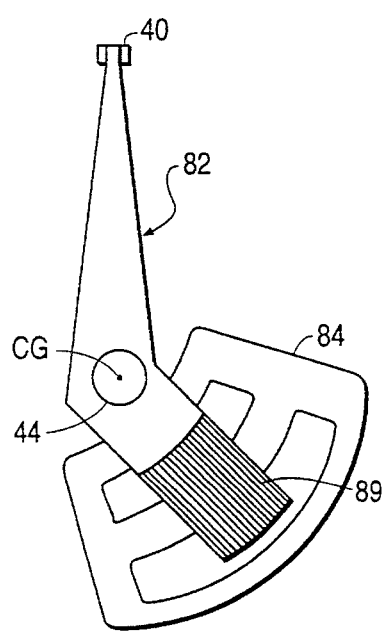
FIG. 16 illustrates an angled arm configuration of the invention.

As FIG. 16 illustrates, the invention allows that the arm 82 can even be angled if need, as long as the arm is mounted at its CG. This allows for a very compact disk drive and increases design flexibility.

The embodiments of the invention described thus far assume that the magnet and yoke structures are fixed in place and that the coil structure is in motion. By Newton's laws of action and equivalent reaction, however, the same forces developed by these actuators may be utilized to cause the magnet and yoke structures to move while the coil structure is fixed in place. It is recognized by those skilled in the art that so-called "moving coil" designs inherently have a lower moment of inertia than an equivalent "moving magnet" structure.

Nevertheless, there are applications where this invention has advantages when implemented as a "moving magnet" design. Accordingly, any of the figures can be interpreted as having a coil structure which is fixed, whereby the magnet and all or part of the yoke structure would be in motion. FIGS. 15(a)–(d), for example, may be interpreted as illustrating a fixed coil and a magnet, which may include parts of the yoke structure, in motion and which would be attached to the arm.

Figure 15A:
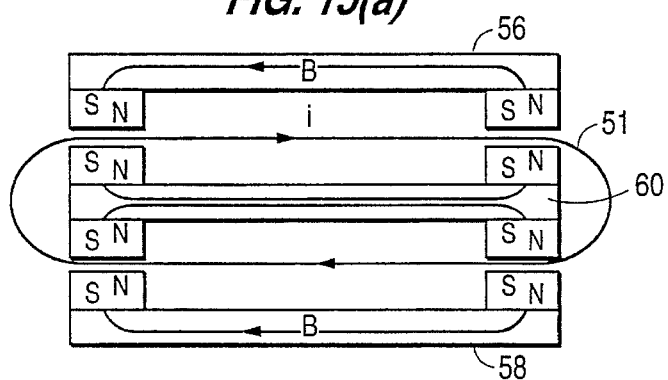
FIGS. 15 (a)–(d) illustrate examples of alternative yoke and magnet configurations.
Figure 15B:
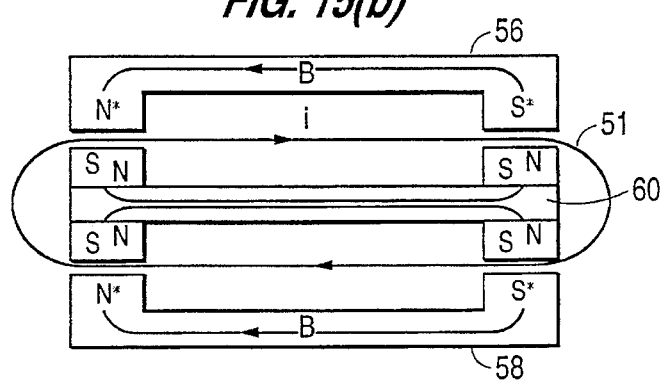
Figure 15C:
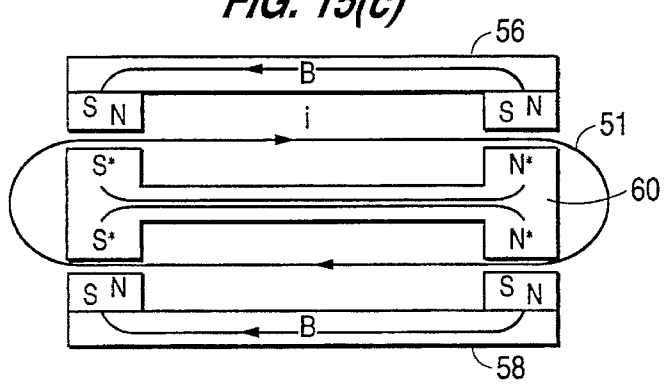
Figure 15D:
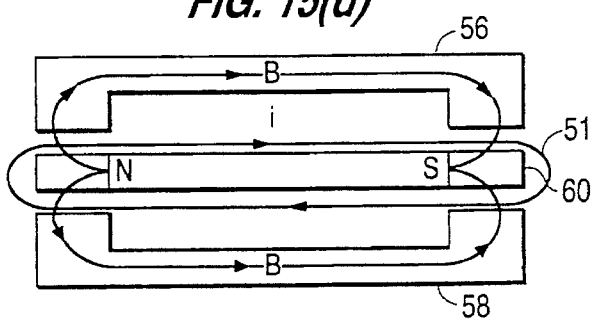

Specifically, a moving magnet design could be described in FIG. 15(a) assuming the coil 51 to be fixed in place relative to the drive base and the magnet, together with the yoke structure 56, 58 and 60 to be attached to the arm (not shown), which would be in motion. Similarly, in FIG. 15(b), the coil 51 and that part of the yoke structure 56, 58 which has induced fields could be fixed in place, and the magnet structure (on yoke 60) alone could be attached to the arm, which would be in motion. In FIG. 15(c), the coil 51 and that part of the yoke 60 which has induced fields could be fixed in place, and the magnet structures on yokes 56, 58 could be attached to the arm, which would be in motion. Finally, in FIG. 15(d) the coil 51 and the yoke structures 56, 58 could be fixed in place while the central magnet structure could be attached to the arm, which would be in motion.

The invention is described above with reference to head positioning systems for disk drive units. The invention is particularly useful in such applications because it allows for greater speed, less wear and greater precision, all of which are extremely important in the improvement (including ability to miniaturize, to increase density, to lessen access time, etc.) of disk drives. Other applications are possible. For example, any system in which an arm is used as a rotating indicator, especially one that needs to move back and forth often, quickly and precisely, can use the invention.

Also, the invention is applicable to other memory technologies, such as the emerging field of optical, magneto-optical, or CD memories. In these technologies, a laser is positioned on a head to read from (and, in the case of erasable CD-ROM technology and magneto-optical memories, also to write to) the optical medium.

We claim:

1. A head positioning system comprising:
   a. an actuator arm body having first and second end portions and a center of gravity located between said portions, said actuator arm body comprising a coil, a head assembly and an actuator arm;
   b. a pivot bearing rotatably supporting said actuator arm body at a pivot point located substantially at the center of gravity of said actuator body, said pivot bearing having an axis;
   c. a magnetic circuit including a permanent magnet arrangement;
   d. said coil and said magnet arrangement being located to apply a pure torque force couple to said actuator arm body at a location remote from said pivot bearing to thereby effect a pivotal movement of said actuator arm body about said pivot bearing; and
   e. said coil and said magnet arrangement being arranged and configured such that said pure force torque couple is provided with a substantially constant torque arm length regardless of the angular location of said actuator arm body.

2. A head positioning system as defined in claim 1 in which:
   a. said coil is wound substantially in a plane which is perpendicular to the axis of said pivot bearing;
   b. said coil comprises two straight parts;
   c. said magnetic circuit comprises four upper magnetic poles which are located over said coil and four lower magnetic poles which are located under said coil; and
   d. said magnetic circuit forms two opposing magnetic flux paths for each said straight part of said coil, said two opposing magnetic flux paths being adjacent to each other at the center of the length of each said straight part of said coil.

3. A head positioning system as defined in claim 1 in which:
   a. said magnetic circuit further comprises:
      i. a substantially arc shaped first opening having a first outer wall and a first inner wall;
      ii. a substantially arc-shaped second opening having a second outer wall and a second inner wall;
      iii. a substantially arc-shaped central yoke portion separating the outer and inner openings; and
      iv. each outer wall and inner wall extending vertically, whereby the arc-shaped central portion is delimited radially by the first outer wall and the second inner wall;
   in which:
   the permanent magnet arrangement includes a first permanent magnet and a second permanent magnet;
   the first and second permanent magnets are arranged on either side of a cylindrical surface that extends vertically; and
   said coil encircles said arc-shaped central yoke portion and has a pair of vertical winding portions which extend mainly vertically through one of the openings in the supporting yoke.

4. A head positioning system as defined in claim 3 wherein said first and second permanent magnets are attached to either side of said central yoke portion.

5. A head positioning system as defined in claim 3 wherein said first permanent magnet is attached to said central arc-shaped portion of the yoke and said second permanent magnet is attached to said second outer wall.

6. A head positioning system as defined in claim 3 wherein the first and the second permanent magnets are shaped generally as concentric, circular arc sections.

7. A head positioning system as defined in claim 6 wherein the circular arc sections are centered at the pivot point of the actuator arm body.

8. A head positioning system as defined in claim 1 wherein:
   a. said permanent magnet arrangement is substantially arcuate in shape;
   b. said system further includes a supporting yoke assemblage including an induced magnetic member, said yoke holding the permanent magnet, said yoke comprising:
      i. substantially radially extending side portions;

ii. an arcuate inner portion forming an inner induced pole of said induced magnetic member; and iii. an arcuate outer portion forming an outer induced pole of said induced magnetic member; and c. said coil encircles the permanent magnet and has portions which extend substantially vertically on either side of the permanent magnet between the latter and an induced pole.

9. A head positioning system as defined in claim 8 in which the permanent magnet and the arcuate inner and outer portions of the yoke are substantially concentric.

10. A head positioning system as defined in claim 8 in which the yoke is non-magnetic.

11. A head positioning system as defined in claim 1 wherein the motion of the actuator arm body defines a plane of motion thereof, said system further including:

a supporting yoke having a central opening with a substantially arcuate inner wall and a substantially arcuate outer wall, with the inner and outer walls extending mainly perpendicular to the plane of motion of the actuator arm body, and wherein:

the permanent magnet arrangement includes a first permanent magnet and a second permanent magnet;

the first and second permanent magnets are arranged with reversed polarities relative to one another on respective cylindrical surfaces that extend mainly perpendicular to the plane of motion of the arm and pass through the central opening of the yoke; and the coil has winding portions which extend mainly vertically within the central opening between the first and second permanent magnets.

12. A head positioning system as defined in claim 11 in which the first permanent magnet is attached to the inner wall and the second permanent magnet is attached to the outer wall.

13. A head positioning system as defined in claim 12 in which the first and second permanent magnets are shaped generally as concentric, circular arc sections.

14. A head positioning system as defined in claim 13 in which the circular arc sections are centered at said pivot point.

* * * * *

UNITED STATES PATENT AND TRADEMARK OFFICE
CERTIFICATE OF CORRECTION

PATENT NO. : 5,523,911
DATED : June 4, 1996
INVENTOR(S) : Masahiro MITA et al.

It is certified that error appears in the above-indentified patent and that said Letters Patent is hereby corrected as shown below:

Column 11, line 9, before "F", insert -- ⇒ --.

Signed and Sealed this

Seventeenth Day of September, 1996

Attest:

BRUCE LEHMAN

Attesting Officer    Commissioner of Patents and Trademarks